US008116767B2

(12) United States Patent
Jiang et al.

(10) Patent No.: US 8,116,767 B2
(45) Date of Patent: Feb. 14, 2012

(54) METHOD AND SYSTEM FOR RETRY OF PACKET DATA CALLS

(75) Inventors: Qing Jiang, Long Grove, IL (US); Daniel J. Declerck, Lake Barrington, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 440 days.

(21) Appl. No.: 12/341,469

(22) Filed: Dec. 22, 2008

(65) Prior Publication Data

US 2010/0159925 A1     Jun. 24, 2010

(51) Int. Cl.
*H04W 60/00*     (2009.01)
(52) U.S. Cl. .................... 455/435.1; 455/434; 455/452.1
(58) Field of Classification Search .......... 455/434–442; 370/311, 328–338
See application file for complete search history.

(56) References Cited

U.S. PATENT DOCUMENTS

| 6,904,033 | B1 * | 6/2005 | Perras et al. | 455/435.1 |
| 7,720,482 | B2 * | 5/2010 | Chaudry et al. | 455/442 |
| 2005/0070280 | A1 * | 3/2005 | Jung et al. | 455/434 |
| 2006/0234707 | A1 * | 10/2006 | Byun et al. | 455/436 |

OTHER PUBLICATIONS

3GPP2 X.S0011-002-D; Version: 1.0; Version Date: Feb. 2006; "cdma2000 Wireless IP Network Standard:Simple IP and Mobile IP Access Services".*
CDMA2000 Wireless IP Network Standard: Simple IP and Mobile IP Access Services. Version 2.0—Version Date: Nov. 2008—2 Pages.

* cited by examiner

*Primary Examiner* — Kent Chang
*Assistant Examiner* — Kashif Siddiqui
(74) *Attorney, Agent, or Firm* — Stephen H. Shaw

(57) ABSTRACT

A method and system for retry of a packet data call. The method can include the steps of attempting (210) an IP registration with a mobile unit (110) to make a packet data call using a first protocol on a network (120) that employs both the first protocol and a second protocol for packet data calls and detecting (212) a failure in the IP registration using the first protocol due to a failure in a data link layer of the first protocol. A physical layer of the first protocol is unaffected by the failure in the data link layer of the first protocol such that communications may still be performed over the physical layer. The method can also include the steps of—at the mobile unit—ceasing (214) the attempted IP registration using the first protocol on the network and attempting (216) an IP registration with the mobile unit using the second protocol of the network. As an example, the first protocol can be EVDO, and the second protocol can be 1X.

13 Claims, 2 Drawing Sheets

METHOD AND SYSTEM FOR RETRY OF PACKET DATA CALLS

BACKGROUND OF THE INVENTION

1. Field of the Invention

The subject matter described herein concerns the transmission of packet data calls and more particularly, the retry of the transmission of packet data calls.

2. Description of the Related Art

Currently, many mobile units have the capability of conducting packet data calls in which voice is carried over data packets, as opposed to a circuit-switched call. For example, a number of mobile units conduct packet data calls using the telecommunications standard Evolution-Data Optimized, or EVDO, which is part of the CDMA2000 family of standards. Another protocol that belongs to CDMA2000 is 1X Radio Transmission Technology (RTT), or simply 1X. When using 1X, a mobile unit may transmit data or voice over a packet data network. There are several existing handsets that have the capability of transmitting packet data using EVDO or 1X. EVDO has higher transmit speeds, however, and is preferred over 1X when transmitting packet data.

As part of the transmission of packet data and as known in the art, a mobile unit may perform Mobile Internet Protocol (MIP) or Simple Internet Protocol (SIP) registration on the EVDO network. Typically, because MIP registration allows the mobile unit to maintain a permanent IP address when moving from one network to another, the mobile unit will attempt MIP registration on the EVDO network first. If this registration does not succeed, then the mobile unit will attempt SIP registration on the EVDO network. If the SIP registration fails, then the mobile unit will wait a predetermined amount of time before attempting another round of MIP/SIP registrations on EVDO. In certain circumstances, the cause of the registration failures is a failure in the data link layer of the EVDO network. This failure in the data link layer, however, may not affect the operation of the physical layer of the EVDO network. Because the physical layer is unaffected, the mobile unit will simply continue with the attempted MIP/SIP registrations on the EVDO network. After all the attempts have been exhausted, the mobile unit will abort the attempted call.

SUMMARY OF THE INVENTION

A method and system for retry of a packet data call is described herein. The method can include the steps of attempting an Internet Protocol (IP) registration with a mobile unit to make a packet data call using a first protocol on a network that employs both the first protocol and a second protocol for packet data calls and detecting a failure in the IP registration using the first protocol due to a failure in a data link layer of the first protocol. In this case, a physical layer of the first protocol is unaffected by the failure in the data link layer of the first protocol such that communications may still be performed over the physical layer. The method may also include the steps of—at the mobile unit—ceasing the attempted IP registration using the first protocol on the network and attempting an IP registration with the mobile unit using the second protocol of the network. As an example, the first protocol may offer a transmission speed that is higher than that offered by the second protocol. As another example, the first protocol can be EVDO, and the second protocol can be 1X.

In one arrangement, attempting the IP registration with the mobile unit using the first protocol can include attempting an MIP registration with the mobile unit and the network using the first protocol. In another arrangement, attempting the IP registration with the mobile unit using the first protocol can further include attempting an SIP registration with the mobile unit and the network using the first protocol if the attempted MIP registration is unsuccessful.

In yet another arrangement, attempting the IP registration with the mobile unit using the second protocol can include attempting an MIP registration with the mobile unit and the network using the second protocol. Also, attempting the IP registration with the mobile unit using the second protocol can further include attempting an SIP registration with the mobile unit and the network using the second protocol if the attempted MIP registration using the second protocol is unsuccessful.

A method of re-initiating a packet data call on a network that employs both EVDO and 1X protocols is also described herein. The method can include the steps of attempting an MIP registration through the EVDO protocol with a mobile unit on the network for a packet data call on the mobile unit and if the MIP registration is unsuccessful, attempting an SIP registration through the EVDO protocol with the mobile unit on the network. If both the MIP and SIP registrations are unsuccessful, the mobile unit can be switched to operate in the 1X protocol in which the unsuccessful EVDO MIP and SIP registrations are caused by an EVDO data link layer. An EVDO physical layer, however, still allows for communication over the EVDO physical layer. In response to the unsuccessful MIP and SIP registrations using the EVDO protocol, an MIP registration or an SIP registration can be attempted with the mobile unit and the network through the 1X protocol for the packet data call on the mobile unit.

A mobile unit capable of making packet data calls using both a first protocol and a second protocol is also described herein. The mobile unit can include a transceiver that communicates with a network using the first protocol and the second protocol and a call control module that is coupled to the transceiver. The call control module can be operable to attempt a first IP registration with the network using the first protocol and to detect a failure in the first IP registration due to a data link layer failure in which a physical layer of the first protocol is still capable of conducting communications. The call control module can also be operable to—in response to the failure detection—attempt a second IP registration with the network using the second protocol. As an example, the first protocol can be a default choice over the second protocol for transmission of packet data, and the first protocol can be EVDO, and the second protocol can be 1X.

In one embodiment, the call control module can be operable to attempt the first IP registration with the network using the first protocol by first attempting an MIP registration with the network using the first protocol followed by attempting an SIP registration with the network using the first protocol if the MIP registration is unsuccessful. In another embodiment, the call control module can be operable to attempt the second IP registration with the network using the second protocol by first attempting an MIP registration with the network using the second protocol, followed by attempting an SIP registration with the network using the second protocol if the MIP registration is unsuccessful.

BRIEF DESCRIPTION OF THE DRAWINGS

Features that are believed to be novel are set forth with particularity in the appended claims. The claimed subject matter may best be understood by reference to the following description, taken in conjunction with the accompanying drawings, in the several figures of which like reference numerals identify like elements, and in which:

DETAILED DESCRIPTION

Figure 1:
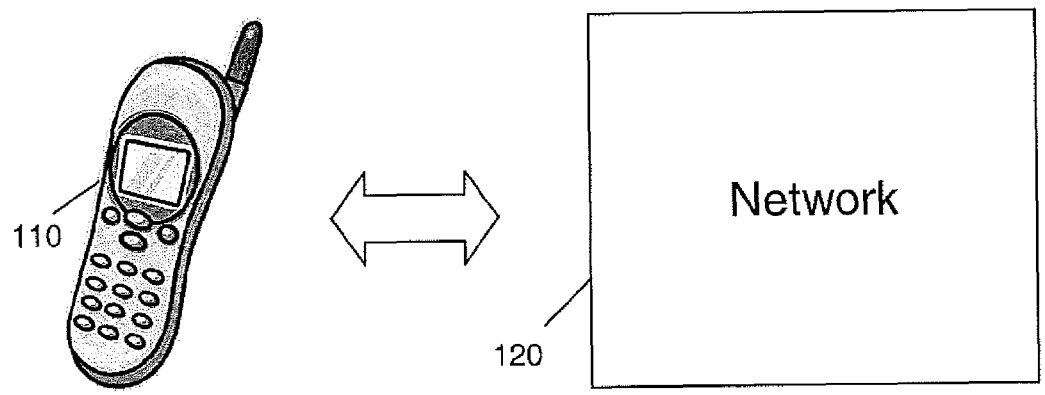
FIG. 1 illustrates an example of a system for retry of packet data calls and an example of a block diagram of a mobile unit.
Figure 1:
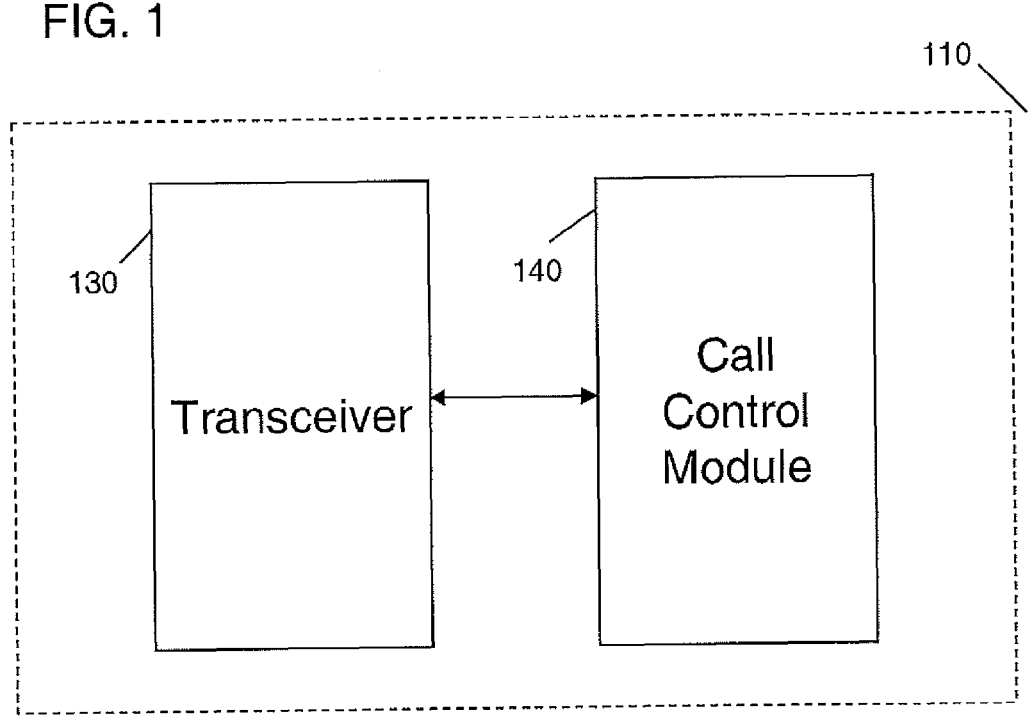

As required, detailed embodiments of the claimed subject matter are disclosed herein; however, it is to be understood that the disclosed embodiments are merely exemplary and can be embodied in various forms. Therefore, specific structural and functional details disclosed herein are not to be interpreted as limiting, but merely as a basis for the claims and as a representative basis for teaching one skilled in the art to variously employ the claimed subject matter in virtually any appropriately detailed structure. Further, the terms and phrases used herein are not intended to be limiting but rather to provide an understandable description.

The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The terms "coupled" or "communicatively coupled" as used herein are defined as connected, although not necessarily directly, and not necessarily mechanically.

The term "transceiver" can be defined as any component or group of components that is capable of receiving and/or transmitting communications signals. The term "mobile unit" can mean any portable communication unit capable of at least receiving transmissions. The term "packet data call" means a call in which the information to be carried over the call, including both voice and data, is converted into packets and transmitted over a network for receipt at a communication device. A "protocol" is defined as a set of rules for the transmission of information over a communications channel, such as data representation, signaling, authentication and error detection. The term "network" means any group of components that are required to establish communications between a plurality of communication devices and includes arrangements that involve fixed infrastructure devices and ad hoc and asynchronous settings.

The term "physical layer" is defined as a layer that translates communication requests from other layers into hardware-specific operations to effect transmission or reception of electronic signals. The term "data link layer" is defined as a layer that transfers data between adjacent network nodes in a wide area network or between nodes on the same local area network segment and issues service requests to a physical layer.

The subject matter in this document refers to a method and system for retry of a packet data call. The method can include the steps of attempting an IP registration with a mobile unit to make a packet data call using a first protocol on a network that employs both the first protocol and a second protocol for packet data calls and detecting a failure in the IP registration using the first protocol due to a failure in a data link layer of the first protocol. A physical layer of the first protocol is unaffected by the failure in the data link layer of the first protocol such that communications may still be performed over the physical layer. The method can also include the steps of—at the mobile unit—ceasing the attempted IP registration using the first protocol on the network and attempting an IP registration with the mobile unit using the second protocol of the network. As an example, the first protocol is EVDO, and the second protocol is 1X. This process can enable another attempt to make a packet data call at a mobile unit, even when the physical layer of the EVDO protocol is unaffected, instead of simply aborting the attempt.

Referring to FIG. 1, a system 100 for retry of a packet data call is shown. In this arrangement, one or more mobile units 110 may be communicating with one or more networks 120. As an example, the mobile unit 110 may have the capability to communicate with the network 120 using a first protocol, such as EVDO, or a second protocol, such as 1X. It must be noted, however, that these particular protocols are merely listed as examples, and the description here is not so limited. The network 120 may include all the components necessary for routing packet data calls, including base station transceiver subsystems, base station controllers, packet data serving nodes, foreign agents and/or home agents, as those skilled in the art will appreciate.

A block diagram of an exemplary mobile unit 110 is also pictured in FIG. 1. In one arrangement, the mobile unit 110 can include one or more transceivers 130 and a call control module 140, which can be coupled to the transceiver 130. Those skilled in the art will appreciate that the mobile unit 110 may include other components for performing various functions associated with wireless communications. The transceiver 130 can be used to communicate with the network 120 using either the first protocol or the second protocol. The call control module 140 can include any suitable arrangement of software and circuitry for setting up packet data calls for the mobile unit 110 using the first protocol or the second protocol. Detailed examples of this process will be presented below.

Figure 2:
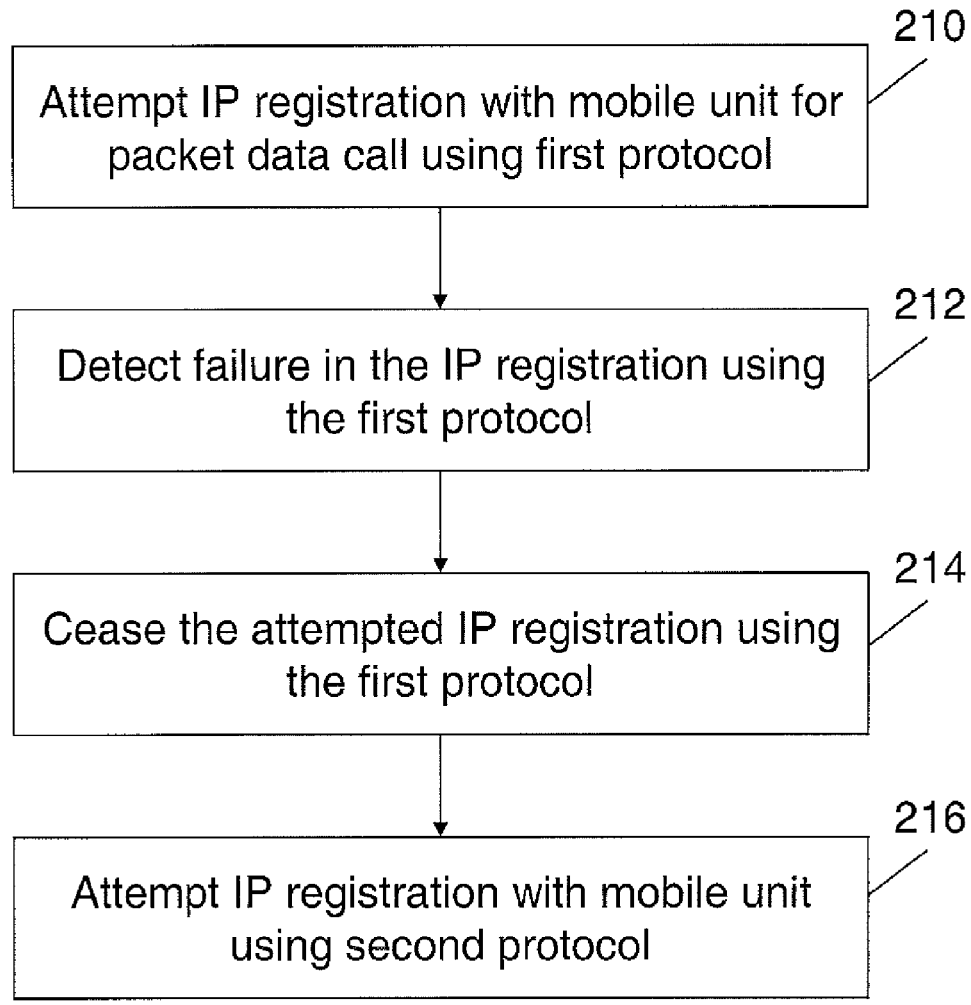
FIG. 2 shows an example of a method for retry of a packet data call.

Turning to FIG. 2, a method 200 for retry of packet data calls is shown. To describe this method 200, reference will be made to FIG. 1, although it is understood that the method 200 can be practiced in any other suitable system using any other suitable components. Moreover, the steps of the method 200 are not limited to the particular order in which they are presented in the figure. Also, the method 200 can have a greater number of steps or a fewer number of steps than those shown in the figure.

At step 210, an IP registration can be attempted with a mobile unit for a packet data call using a first protocol, and at step 212, a failure in the IP registration using the first protocol can be detected. The attempted IP registration using the first protocol can be ceased at the mobile unit, as shown at step 214. At step 216, an IP registration with the mobile unit can be attempted using a second protocol.

For example, the user of the mobile unit 110 may wish to place a data packet call, which will be sent over the network 120, and the mobile unit 110 may be configured to initiate the call using the first protocol. In this example, the first protocol may be EVDO. As noted earlier, the mobile unit 110 may also have the capability to place calls to the network 120 using a second protocol, such as 1X. In this case, EVDO provides higher transmission speeds when compared to 1X, and as such, EVDO may be a default choice for the mobile unit 110 over 1X for placing packet data calls.

As part of initiating the call, the call control module 130 of the mobile unit 110 may be configured to attempt an IP registration with the network 120 using EVDO. As an example, the call control module 140 can attempt an MIP registration with the network 120. If this attempt fails, the call control module 140 may then try an SIP registration with the network 120. Although MIP registration may be generally favored over SIP registration for the mobile unit 110, it must be understood that the description here is not so limited, as SIP registration, or any other suitable form of IP registration, may be tried first by the mobile unit 110 for purposes of placing a packet data call.

There may be certain circumstances where the IP registration using EVDO fails. As an example, this failure may be caused by a problem in the data link layer of the EVDO protocol due to a component malfunction in the network 120. Generally, the IP registration is considered a failure when both the MIP and SIP registrations fail, although the IP registration may be so considered when only a failure occurs in one (i.e., not both) of the MIP and SIP registrations. In this example, although there is a problem in the data link layer of the EVDO protocol, the physical layer may not be affected such that the mobile unit 110 would still be able to communicate over the physical layer.

Once the IP registration failure using EVDO is detected, the call control module 140 may cease the attempted IP registration using EVDO and can then direct an effort for an IP registration with the network 120 using the second protocol, or 1X. Here, the call control module 140 may be configured to try an MIP registration first, followed by an SIP registration attempt if the MIP registration is faulty. The order of the MIP and SIP registrations is not so limited, however, and other types of IP registrations may be considered. After the 1X packet data call is completed, the call control module 140 may have the option of returning to the EVDO protocol as a default setting for initiating packet data calls or may keep the 1X protocol in place for such calls.

The above description provides a solution to the problem of dropping packet data calls when there is an issue in a higher layer but the physical layer for EVDO is unaffected. Switching to 1X in this situation can ensure that a user's call can still be executed, as desired.

While the various embodiments of the present invention have been illustrated and described, it will be clear that the claimed subject matter is not so limited. Numerous modifications, changes, variations, substitutions and equivalents will occur to those skilled in the art without departing from the spirit and scope of the present invention as defined by the appended claims.

What is claimed is:

1. A method for retry of a packet data call, comprising:
   After effecting transmission or reception of electronic signals to or from a first protocol:
   attempting an Internet Protocol (IP) registration with a mobile unit to make a packet data call using the first protocol on a network that employs both the first protocol and a second protocol for packet data calls;
   detecting a failure in the IP registration using the first protocol due to a failure in a data link layer of the first protocol, wherein nevertheless communications remain actively connected to the first protocol;
   at the mobile unit, intentionally stopping the attempted IP registration using the first protocol on the network; and
   attempting an IP registration with the mobile unit using the second protocol of the network.

2. The method according to claim 1, wherein the first protocol offers a transmission speed that is higher than that offered by the second protocol.

3. The method according to claim 1, wherein attempting the IP registration with the mobile unit using the first protocol comprises attempting a mobile IP (MIP) registration with the mobile unit and the network using the first protocol.

4. The method according to claim 3, wherein attempting the IP registration with the mobile unit using the first protocol further comprises attempting a simple IP (SIP) registration with the mobile unit and the network using the first protocol if the attempted MIP registration is unsuccessful.

5. The method according to claim 1, wherein attempting the IP registration with the mobile unit using the second protocol further comprises attempting an MIP registration with the mobile unit and the network using the second protocol.

6. The method according to claim 5, wherein attempting the IP registration with the mobile unit using the second protocol further comprises attempting an SIP registration with the mobile unit and the network using the second protocol if the attempted MIP registration using the second protocol is unsuccessful.

7. The method according to claim 1, wherein the first protocol is Evolution-Data Optimized (EVDO), and the second protocol is 1X Radio Transmission Technology (1X).

8. A method of re-initiating a packet data call on a network that employs both EVDO and 1×protocols, comprising:
   After effecting transmission or reception of electronic signals to or from the EVDO protocol:
   attempting an MIP registration through the EVDO protocol with a mobile unit on the network for a packet data call on the mobile unit;
   if the MIP registration is unsuccessful, attempting an SIP registration through the EVDO protocol with the mobile unit on the network;
   if both the MIP and SIP registrations are unsuccessful, switching the mobile unit to operate in the 1×protocol, wherein the unsuccessful EVDO MIP and SIP registrations are caused by an EVDO data link layer failure, yet an EVDO physical layer remains actively and communicatively connected to the EVDO protocol; and
   intentionally stopping MIP and SIP registrations using the EVDO protocol and attempting an MIP registration or an SIP registration with the mobile unit and the network through the 1X protocol for the packet data call on the mobile unit.

9. A mobile unit for making packet data calls using both a first protocol and a second protocol, comprising:
   a transceiver that acquires a communication connection with a network using the first protocol; and
   a call control module that is coupled to the transceiver, wherein the call control module:
   attempts a first IP registration with the network using the first protocol;
   detects a failure in a data link layer, although a physical layer of the first protocol remains actively and communicatively connected to the first protocol;
   in response to the data link layer failure detection, intentionally stopping the first IP registration and attempts a second IP registration with the network using the second protocol.

10. The mobile unit according to claim 9, wherein the first protocol is a default choice over the second protocol for transmission of packet data.

11. The mobile unit according to claim 9, wherein the call control module is operable to attempt the first IP registration with the network using the first protocol by first attempting an MIP registration with the network using the first protocol followed by attempting an SIP registration with the network using the first protocol if the MIP registration is unsuccessful.

12. The mobile unit according to claim 9, wherein the call control module is operable to attempt the second IP registration with the network using the second protocol by first attempting an MIP registration with the network using the second protocol followed by attempting an SIP registration with the network using the second protocol if the MIP registration is unsuccessful.

13. The mobile unit according to claim 9, wherein the first protocol is Evolution-Data Optimized (EVDO), and the second protocol is 1X Radio Transmission Technology (1X).

* * * * *